Oct. 22, 1963  P. SCHREIBER ETAL  3,107,689
NARCOSIS APPARATUS
Filed Dec. 20 1960

INVENTORS
Peter Schreiber
Emil Egidi
BY
Bailey, Stephens + Huettig
ATTORNEYS

United States Patent Office 3,107,689
Patented Oct. 22, 1963

3,107,689
NARCOSIS APPARATUS
Peter Schreiber and Emil Egidi, Lubeck, Germany, assignors to Otto Heinrich Drager, Lubeck, Germany
Filed Dec. 20, 1960, Ser. No. 77,105
Claims priority, application Germany July 22, 1960
1 Claim. (Cl. 137—599.1)

This invention relates to a narcosis apparatus and, in particular, to a vaporizer type apparatus.

Narcosis apparatuses are known which have an inlet pipe to a vaporizer, an outlet pipe from the vaporizer, and a by-pass pipe connected in parallel with the vaporizer. A control means such as a manually operated valve can be inserted either in the inlet pipe connected to the vaporizer or in the by-pass pipe by reason of which the ratio of the gas flowing in the by-pass pipe and the gas flowing through the vaporizer can be regulated to obtain the desired concentration of the narcosis agent in the outlet line. A manually operated valve has the disadvantage in that the mixture ratio in the outlet pipe varies with the velocity of the gas flowing through the vaporizer and the by-pass line. Such is not desirable primarily because the anesthetist cannot detect how the gas ratio has been changed without having further information. In particular, this disadvantage exists in narcosis devices operated either in a closed or an open respiratory system.

The object of this invention is to produce means for maintaining a constant gas mixture ratio regardless of the change in gas velocity through either the vaporizer or by-pass line.

In general, this and other objects of the invention are accomplished by using, in a narcosis apparatus having a by-pass line connected in parallel with a vaporizer, a throttle valve in each of the lines, these valves being formed as conical valves having small conical angles and in which the opening between the valve head and valve seat has a length to width ratio of less than $10^{-2}$ in every open position of the valve.

The means by which the objects of the invention are obatined are described more fully with reference to the accompanying drawings, in which.

Figure 1:
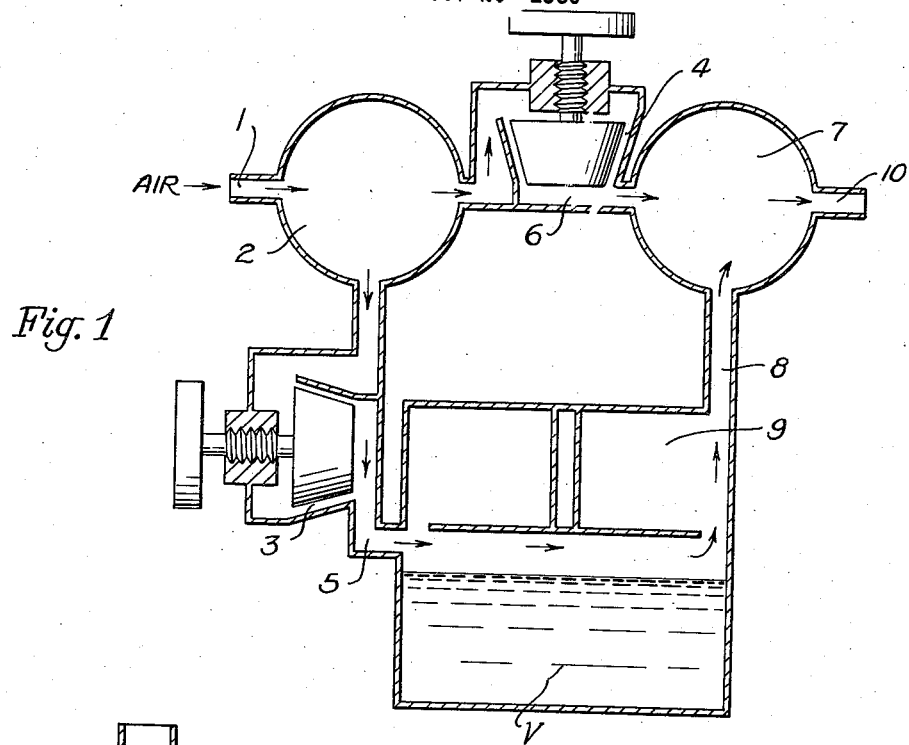
FIGURE 1 is a schematic view of the narcosis apparatus of this invention.

As shown in FIGURE 1, gas, such as air, air mixed with cyclopropane, nitrous oxide, or the like, enters through pipe 1 into distributing chamber 2. Throttle valves 3 and 4, respectively, are mounted in pipe 5 leading to vaporizer tank V and by-pass pipe 6 leading from distributing chamber 2 to outlet chamber 7. Pipe 8 joins chamber 7 to vaporizer 9 which is in communication with tank V. The mixed gases are exhausted through outlet pipe 10.

Figure 2:
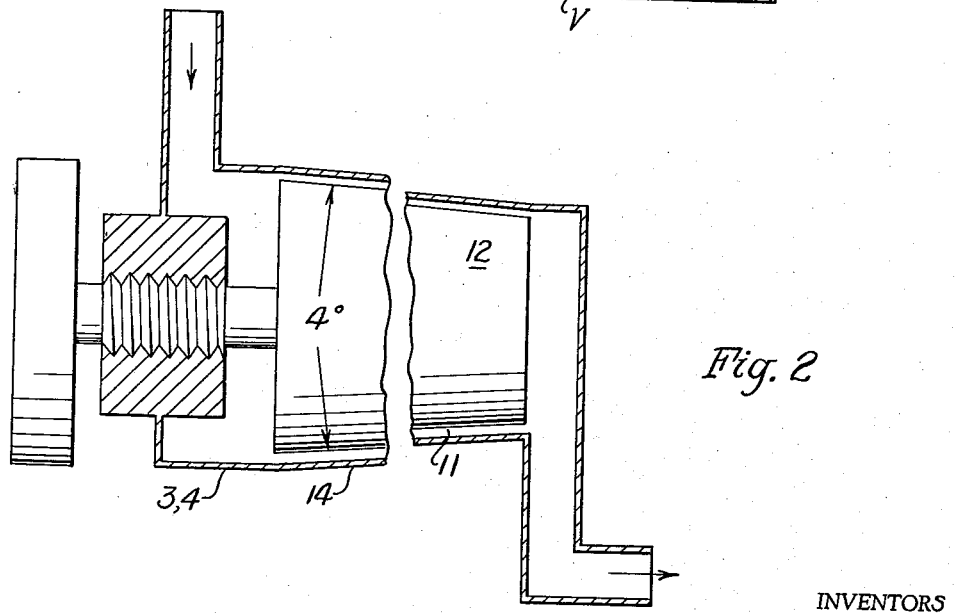
FIGURE 2 is an enlarged exaggerated view of the control valve of this invention.

As shown in detail in FIGURE 2, each of the valves 3 and 4 is similar and of the same size and so constructed that the opening 11 between the conical valve head 12 and its complementary seat 14 has a length to width ratio of less than $10^{-2}$ in every open position of the valve. The conical angle of the valve head is about 4°, as marked in the exaggerated view of FIGURE 2.

Having now described the means by which the objects of the invention are obtained,

We claim:

In a narcosis device having a gas inlet pipe, a gas outlet pipe, a vaporizer joined between said inlet and outlet pipes, a vaporizer by-pass pipe extending between said inlet and outlet pipes, the improvement comprising similar conical throttle valves of the same size mounted respectively in said inlet pipe and in said by-pass pipe, and each throttle valve having a length to width valve opening ratio of less than $10^{-2}$ and a valve head conical angle of about 4° for maintaining a constant gas mixture ratio in said outlet pipe regardless of the change in gas velocity in either said vaporizer or said by-pass pipe.

References Cited in the file of this patent

UNITED STATES PATENTS

| | | |
|---|---|---|
| 2,169,043 | Goehring | Aug. 8, 1939 |
| 2,173,979 | Picut | Sept. 26, 1939 |
| 2,326,021 | Ericsson | Aug. 3, 1943 |
| 2,711,928 | Randa | June 28, 1955 |
| 2,915,061 | Edmondson | Dec. 1, 1959 |
| 2,941,528 | Fabian | June 21, 1960 |